(12) United States Patent
Anderson

(10) Patent No.: US 7,763,840 B2
(45) Date of Patent: Jul. 27, 2010

(54) RADIANT ENERGY COLLECTOR

(75) Inventor: Arnold Anderson, Arlington, TX (US)

(73) Assignee: Solar Power Solutions, Inc., Houston, TX (US)

( * ) Notice: Subject to any disclaimer, the term of this patent is extended or adjusted under 35 U.S.C. 154(b) by 1057 days.

(21) Appl. No.: 11/278,933

(22) Filed: Apr. 6, 2006

(65) Prior Publication Data

US 2006/0225730 A1 Oct. 12, 2006

Related U.S. Application Data

(60) Provisional application No. 60/669,076, filed on Apr. 7, 2005.

(51) Int. Cl.
*F24J 2/10* (2006.01)
(52) U.S. Cl. ........................ 250/216; 126/692
(58) Field of Classification Search ............... 250/216; 126/684, 692, 693, 694, 695
See application file for complete search history.

(56) References Cited

U.S. PATENT DOCUMENTS

| | | | | |
|---|---|---|---|---|
| 3,028,856 A * | 4/1962 | Daymon | ..................... | 126/600 |
| 3,923,039 A * | 12/1975 | Falbel | ..................... | 126/600 |
| 4,131,485 A | 12/1978 | Meinel et al. | | |
| 4,146,408 A * | 3/1979 | Nelson | ..................... | 136/259 |
| 4,149,521 A * | 4/1979 | Fletcher et al. | ..................... | 126/693 |
| 4,168,696 A * | 9/1979 | Kelly | ..................... | 126/683 |
| 4,173,213 A * | 11/1979 | Kelly | ..................... | 126/604 |
| 4,173,968 A * | 11/1979 | Steward | ..................... | 126/654 |
| 4,337,758 A * | 7/1982 | Meinel et al. | ..................... | 126/684 |
| 4,359,265 A * | 11/1982 | Winston | ..................... | 359/852 |
| 4,380,995 A | 4/1983 | Robertson | | |
| 4,440,149 A * | 4/1984 | Hattan | ..................... | 126/573 |
| 4,800,868 A * | 1/1989 | Appeldorn et al. | ..................... | 126/692 |
| 5,374,939 A * | 12/1994 | Pullen, V | ..................... | 343/839 |
| 5,507,276 A * | 4/1996 | Holland | ..................... | 126/693 |
| 5,865,905 A * | 2/1999 | Clemens | ..................... | 136/245 |
| 5,882,434 A * | 3/1999 | Horne | ..................... | 136/246 |
| 6,008,449 A | 12/1999 | Cole | | |
| 6,604,521 B2 * | 8/2003 | Smith et al. | ..................... | 126/657 |
| 6,619,283 B2 * | 9/2003 | Ghela | ..................... | 126/692 |
| 6,668,555 B1 | 12/2003 | Moriarty | | |
| 2002/0139414 A1 | 10/2002 | Vasylyev et al. | | |
| 2003/0047180 A1* | 3/2003 | Smith et al. | ..................... | 126/657 |
| 2004/0159798 A1* | 8/2004 | Martin et al. | ..................... | 250/458.1 |
| 2006/0225730 A1* | 10/2006 | Anderson | ..................... | 126/600 |
| 2008/0127967 A1* | 6/2008 | Kimura et al. | ..................... | 126/694 |
| 2008/0230049 A1* | 9/2008 | Dol | ..................... | 126/692 |

OTHER PUBLICATIONS

Anderson, "PCT—Notification of Transmittal of the International Search Report and the Written Opinion of the International Searching Authority, or the Declaration," Aug. 1, 2007.

* cited by examiner

*Primary Examiner*—John R Lee
(74) *Attorney, Agent, or Firm*—Baker & McKenzie LLP

(57) ABSTRACT

A radiant energy collector comprising a reflective surface having a concave cross-sectional shape, wherein the reflective surface focuses radiant energy onto a receiving surface that is disposed along the focal axis of the reflective surface, wherein the focused radiant energy provides substantially uniform illumination along the entire axial length of the receiving surface.

22 Claims, 5 Drawing Sheets

RADIANT ENERGY COLLECTOR

CROSS-REFERENCE TO RELATED APPLICATIONS

This application claims priority to U.S. Provisional Application Ser. No. 60/669,076, which was filed on Apr. 7, 2005, and which is incorporated herein by reference in its entirety for all purposes.

TECHNICAL FIELD

The present invention relates to the collection of radiant energy and more particularly, to an apparatus for uniform illumination of reflected radiant energy over a receiver area.

BACKGROUND

It is well-known to collect radiant energy through the use of parabolic or spherical reflecting surfaces. In the currently-used technologies, the incoming radiant energy is reflected from these reflective surfaces and focused onto a point located at the focus of the parabola or non-uniformly along a line of the sphere. One problem associated with current technology is that the energy distribution near the focus is non-uniform. Thus, the radiant energy flux near the focal point varies across the beam width. In addition, prior art radiant energy collectors could create dangerous conditions when they lose tracking with the source of the radiant energy. In the case of solar energy collectors, dangerous solar hot spots can be created in unintended locations. More specifically, a parabolic solar reflector has an associated focus that would continue to track the sun if the parabolic reflector becomes inactive. There is therefore a need for a device that can collect and focus radiant energy so that its energy distribution at a target site is substantially uniform. There is also a need for a radiant energy collector that does not create unintended hot spots when the collector loses tracking with the radiant energy source.

SUMMARY

Disclosed herein is a radiant energy collector comprising a reflective surface having a concave cross-sectional shape, wherein the reflective surface focuses radiant energy onto a receiving surface that is disposed along the focal axis of the reflective surface, wherein the focused radiant energy provides substantially uniform illumination along the entire axial length of the receiving surface. Also disclosed herein is a radiant energy collector comprising a reflective surface having an outer portion with a concave cross-sectional shape and an inner portion with a concave cross-sectional shape; wherein the outer portion is adapted to focus radiant energy onto a first receiving surface that is disposed along the focal axis of the reflective surface so that the focused radiant energy provides substantially uniform illumination along the entire axial length of the first receiving surface; and wherein the inner portion is adapted to focus radiant energy onto a second receiving surface that is disposed orthogonally to the focal axis of the reflective surface so that the focused radiant energy provides substantially uniform illumination along the entire orthogonal width of the second receiving surface. The reflector and receiver can have a wide variety combination of sizes and locations that can provide the desired uniform illumination.

DETAILED DESCRIPTION

Figure 1:
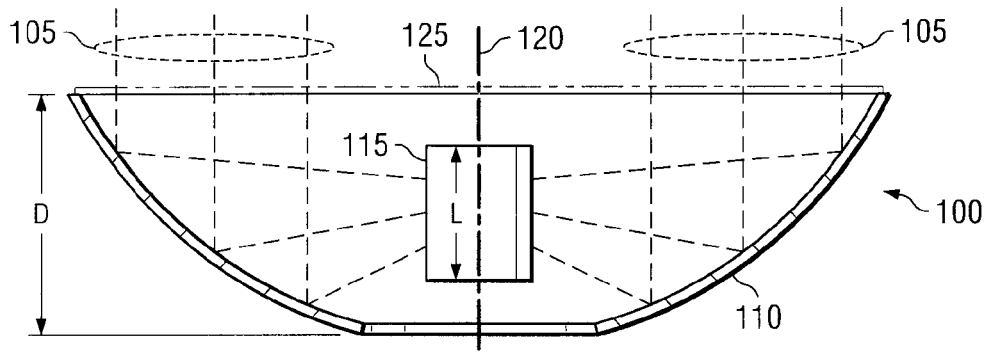
FIG. 1 depicts a cross-sectional view of one embodiment of the radiant energy collector.
Figure 1A:
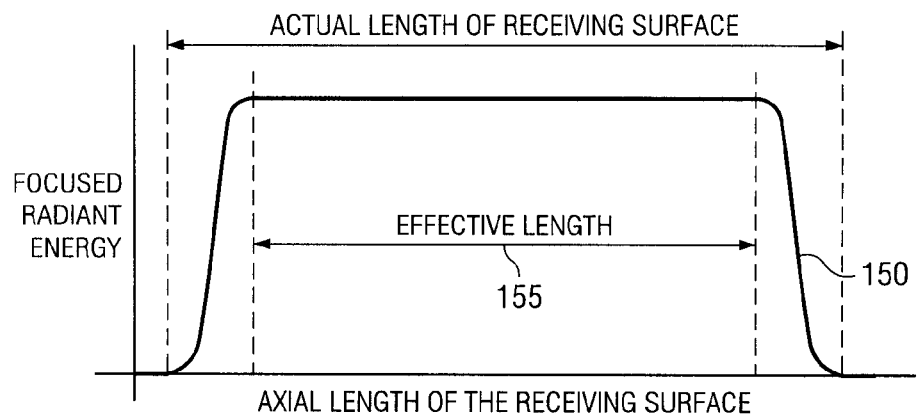
FIG. 1A is a chart depicting the distribution of the radiant energy along the radial length of the receiving surface of FIG. 1.

A cross-sectional view of one embodiment of a radiant energy collector 100 is depicted in FIG. 1. In FIG. 1, radiant energy 105 is received and collected by a reflective surface 110 having a concave shape. The shape of the reflective surface 110 is arranged such that the incoming radiant energy 105 is focused onto a receiving surface 115. The receiving surface of FIG. 1 is disposed along the focal axis 120 of the reflective surface. The shape of the reflective surface 110 is also configured so that the focused radiant energy provides substantially uniform illumination along the entire axial length of the receiving surface 115. A chart depicting the distribution of the focused radiant energy along the axial length of the receiving surface 115 is depicted by line 150 in FIG. 1A. A substantially uniform distribution of energy will generally have a variance less than about 5% along the effective length 155 of the receiving surface 115. Preferably, however, the variance will be less than about 2% along the effective length 115 of the receiving surface 115. The effective length of the receiving surface 115 is the portion of the line 150 between the rise and fall portions of the energy distribution.

Figure 1B:
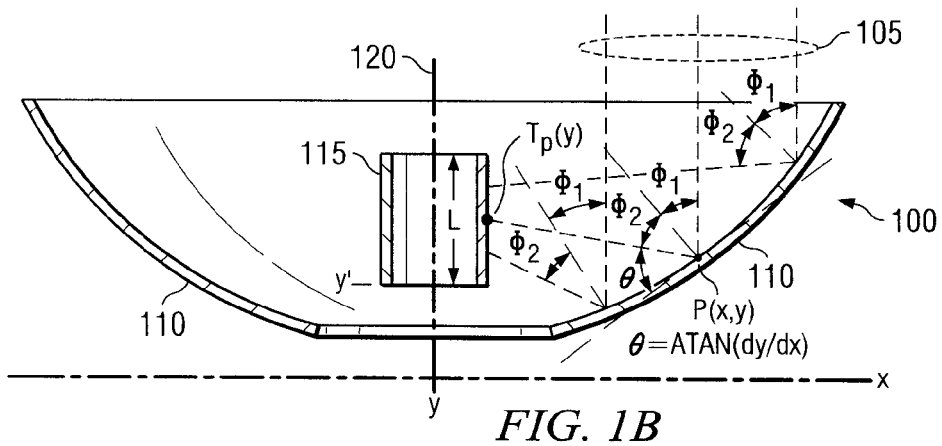
FIG. 1B is a chart depicting the angular calculations defining the shape of the reflecting surface depicted in FIG. 1.

Another view of the embodiment of FIG. 1 is depicted in FIG. 1B. In FIG. 1B, the shape of the reflective surface 110 is determined by the following mathematical formulae. As mentioned previously, the shape of the reflecting surface 110 is arranged so that the collected and focused radiant energy 105 is uniformly distributed along the axial length L of the receiving surface 115. If we assume that the receiving surface 115 is linear (i.e., cylindrical or planar), then the shape of the reflecting surface 110 will be a function of the linear position along the axial length of the of the receiving surface $T_p(y)$. In some embodiments, such as those described with reference to FIG. 8 below, the receiving surface 115 is not planar and may assume a barrel or other non-linear shape. Incoming radiant energy 105 is reflected from the reflecting surface 110 in a manner such that the angle of incidence $\Phi_1$ is equal to the angle of reflection $\Phi_2$, as dictated by the laws of physics. Thus for an incoming ray of radiant energy 105 that intersects with the reflective surface 110 at location P(x,y), the acute reflection angle θ at which that ray of incoming radiant energy is reflected onto the receiving surface 115 is dictated by the slope of the reflecting surface δy/δx at location P(x,y). The shape of the reflecting surface is therefore a complex polynomial according to the following equation:

$$y(x) = A_0 + A_1 x + A_2 x^2 + A_3 x^3 + \ldots A_n x^n$$

The following boundary conditions are also associated with the embodiment depicted in FIG. 1B:

Slope of the reflective surface is $\delta y/\delta x = A_1 + A_2 x + A_3 x^2 + \ldots n A_n x^{n-1}$;

Target Point $T_p$ must be in the range $y' < T_p(y) < y' + L$;

Acute Reflection Angle $\theta = \mathrm{Atan}\, \delta y/\delta x$; and

The flux of focused radiant energy at the receiving surface 115 should be substantially uniform along its entire axial length L.

Given these boundary conditions, the shape of the reflecting surface y(x) can be determined by using common mathematical techniques known in the art. A wide variety of shapes and sizes of receiving surfaces 115 and reflecting surfaces 105 can be utilized consistent with the objectives of this invention.

As shown in FIGS. 1 and 1B, the surface area of the reflective surface 110 is greater than the surface area of the receiving surface 115. Accordingly, the collected radiant energy 105 is concentrated as it is focused onto the receiving surface 115. As a result, the efficiency of a radiant energy collector disposed along the receiving surface 110 can be greatly improved. Further, since the distribution of the focused radiant energy along the axial length of the receiving surface 115 is substantially uniform, the collected and focused radiant energy is uniformly distributed over the entire surface of the receiving surface. This also improves the efficiency of a radiant energy collector since it eliminates "hotspots" and "coldspots" on the collector where the focused radiant energy would be overconcentrated and underconcentrated, respectively.

One advantage of the disclosed shape of the reflecting surface 110 is its high tolerance for imperfections in the reflecting surface 110. Empirically collected data shows that inherent imperfections in the shape of the reflecting surface 110 generally do not produce more than a 2% variance in the distribution of focused radiant energy on the receiving surface 115. Indeed, the surface tolerances of the reflecting surface can be as large as 30 mil-radians, but preferably less than 20 mil-radians. These wider tolerances allow the disclosed invention to be manufactured from less-expensive materials and with less-expensive techniques. These tolerances also permit the disclosed invention to be assembled and utilized in extreme environments where wider tolerances are advantageous.

Another advantage of the embodiment depicted in FIG. 1 is that the axial length "L" of receiving surface 115 is contained within axial depth "D" of the reflecting surface 110. By placing the receiving surface 115 within the depth of the reflecting surface 110, foreign objects are less likely to inadvertently appear in the focusing region for the radiant energy. This improves the efficiency and safety of the radiant energy collector 100. In addition, a transparent surface 125, such as glass, can be placed across the upper opening of the reflecting surface to prevent foreign objects from entering the device and to trap heat within the focusing area. The transparent surface can include infrared and ultraviolet filters, which would prevent undesirable UV radiation from entering the device and would also prevent the desirable IR radiation from leaving the device.

The present invention can be used to collect and focus a wide variety of radiant energy, including solar energy. Solar energy applications include the conversion of sunlight into electricity through photovoltaic cells, or through a heat engine. Both of these applications are much more efficient when the focused radiant energy is uniformly distributed over the entire surface of photovoltaic cells or a heat exchanger, respectively. In addition, the described invention can be particularly effective as a solar oven or solar heater since the focused sunlight would be uniformly distributed over a larger area, which more closely resembles the energy distribution of a conventional oven.

When used to capture and focus solar energy, the reflecting surface can comprise a variety of materials, including mirrored glass, aluminized aluminum, aluminized foil (e.g., SA 85 film manufactured by 3M®), silver on acrylic film, or alanoid microglass. In addition, the reflective material can include or incorporate filtering layers which eliminate undesired components of the incoming radiant energy.

Other forms of radiant energy that can be collected and focused by this device include infrared, radio waves, short-wavelength radiation (e.g., UV, EUV, and X-rays), and microwaves. Further, the device can be used as a source of radiant energy through the principle of reciprocity. This arrangement is particularly suitable for energy sources that emit radiant energy from non-point sources. Suitable applications include lighting fixtures with incandescent, halogen, or vapor-emission light sources. Other possible applications include high-powered radar antennas that need to emit large power energy pulses. Higher-power energy pulses can be utilized with the disclosed system since the energy of these pulses can be spread over a larger surface of the "receiving surface" (note that this surface would be the energy source under principle of reciprocity.)

Another important advantage of the disclosed system is the absence of unintended focal hot spots when the collector loses tracking with the radiant energy source. In the solar energy collector example, once the disclosed system loses tracking with the sun, it would not focus the solar energy in unintended directions. Instead, the reflected sunlight would be effectively scrambled once the sun is "off-track" with the device. This greatly improves the safety of the device, thereby reducing its cost of installation and increasing the number of environments in which it can be installed.

Figure 2:
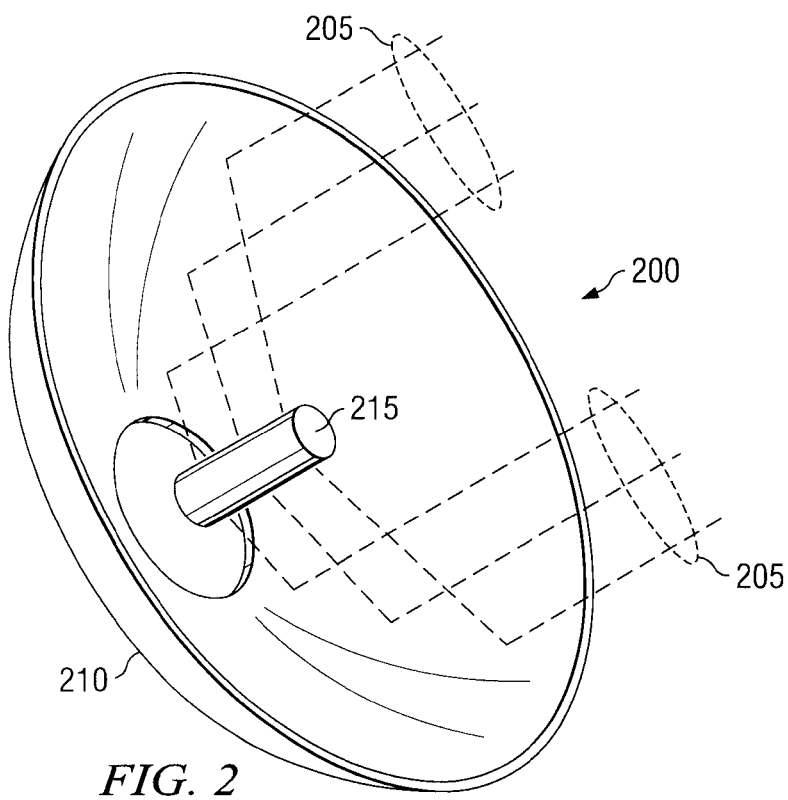
FIG. 2 depicts a bowl-shaped embodiment of the device illustrated in FIG. 1.

A bowl-shaped embodiment of the invention 200 is depicted in FIG. 2. In FIG. 2, the reflecting surface 210 utilizes the shape described above to collect and focus radiant energy 205 onto a cylindrical-type receiving surface 215. One advantage of the bowl-shaped embodiment 200 is that the ratio of the surface area of reflecting surface 210 to the surface area of the receiving surface 215 is very large, thus improving the concentration of the collected radiant energy and thereby its efficiency. Depending upon the needs of the specific application, this ratio can be scaled upward significantly. The bowl-shaped embodiment also has particular advantages for applying focused energy to fluids disposed in the receiving surface (e.g., a heat engine). In one embodiment, the bowl-shaped embodiment can be used to collect and focus sunlight onto a circulating water supply within the receiving surface 215. The high concentration of sunlight on the receiving surface provides very effective solar heating of water. According to one embodiment, the surface area of the reflecting surface 210 can be 20 square feet, or even larger, depending upon the particular parameters of the receiving surface and its energy tolerance. These kinds of large reflecting surfaces are much larger than those possible with parabolic or spherical reflecting surfaces.

Figure 3:
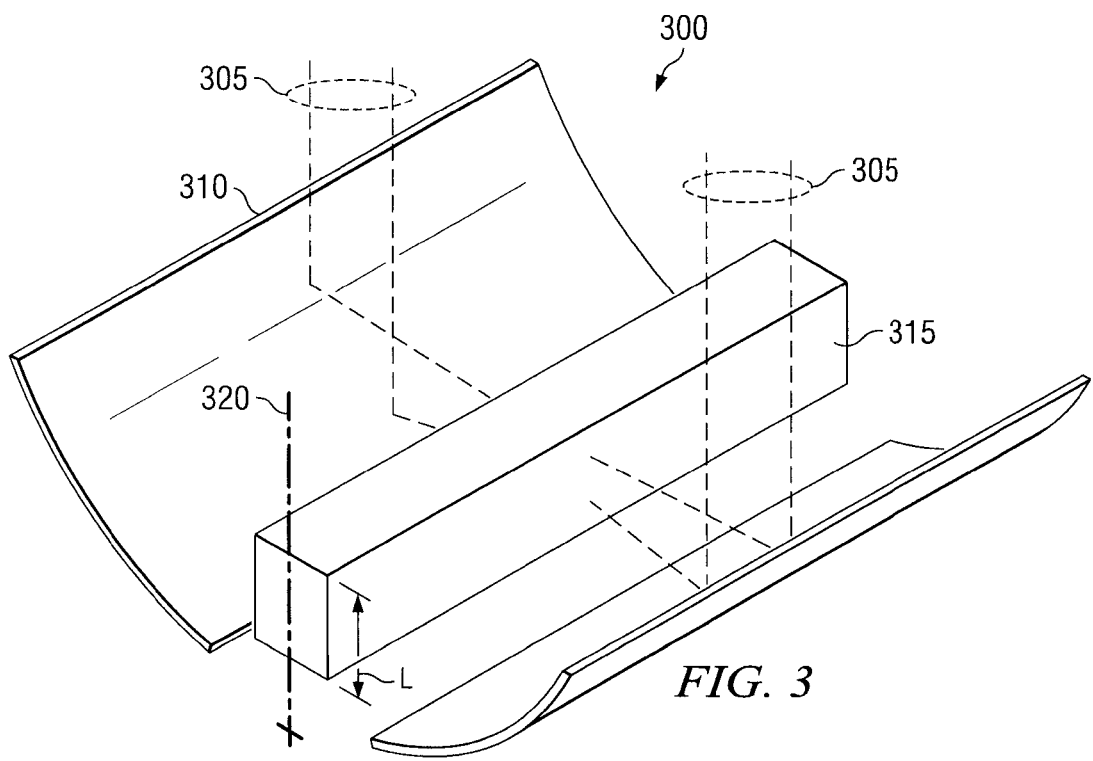
FIG. 3 depicts a trough-shaped embodiment of the device illustrated in FIG. 1.
Figure 3A:
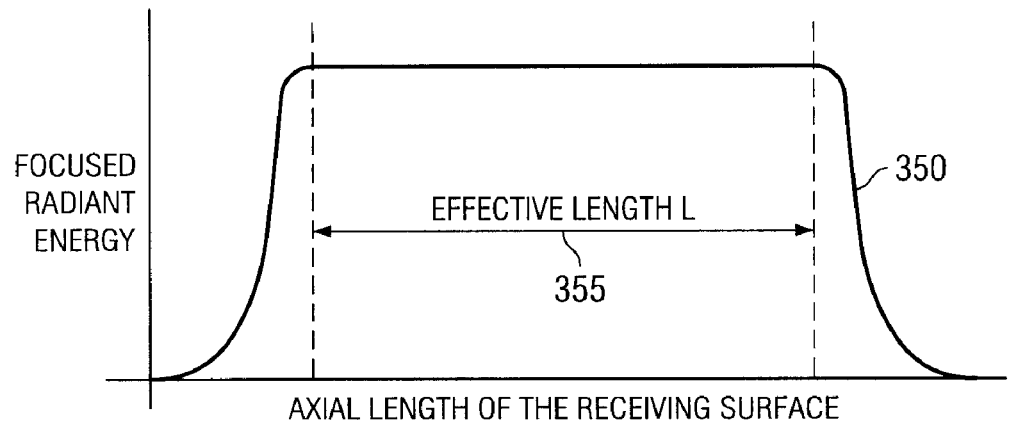
FIG. 3A is a chart depicting the distribution of the radiant energy along the axial length receiving surface of FIG. 3.

A trough-shaped embodiment 300 of the invention is depicted in FIG. 3. In FIG. 3, the reflecting surface 310 utilizes the shape described above to collect and focus radiant energy 305 onto a flat receiving surface 315. One advantage of the trough-shaped embodiment 300 is that the receiving surface 315 is substantially planar. This arrangement is particularly effective when the collected radiant energy 305 is focused onto solar cells or other planar energy collecting devices. The embodiment depicted in FIG. 3 illustrates that a two-sided receiving surface 315 can be utilized (e.g., solar panels on both sides of the planar receiving surface). But a single sided receiving surface 315 can also be used with only one concave reflecting surface 310. As mentioned previously, the curve of the reflecting surface 310 is arranged so that the distribution of the focused radiant energy 305 on the axial length of the receiving surface 31 is substantially uniform. Accordingly, the focused radiant energy provides substantially uniform illumination along the entire axial length L of the receiving surface 315. A chart depicting the distribution of the focused radiant energy along the axial length of the receiving surface 315 is depicted by line 350 in FIG. 3A. A substantially uniform distribution of energy will generally have a variance less than about 5% along the effective length 355 of the receiving surface 315. Preferably, however, the variance will be less than about 2% along the effective length 315 of the receiving surface 315. The effective length of the receiving surface 315 is the portion of the line 350 between the rise and fall portions of the energy distribution.

Figure 4:
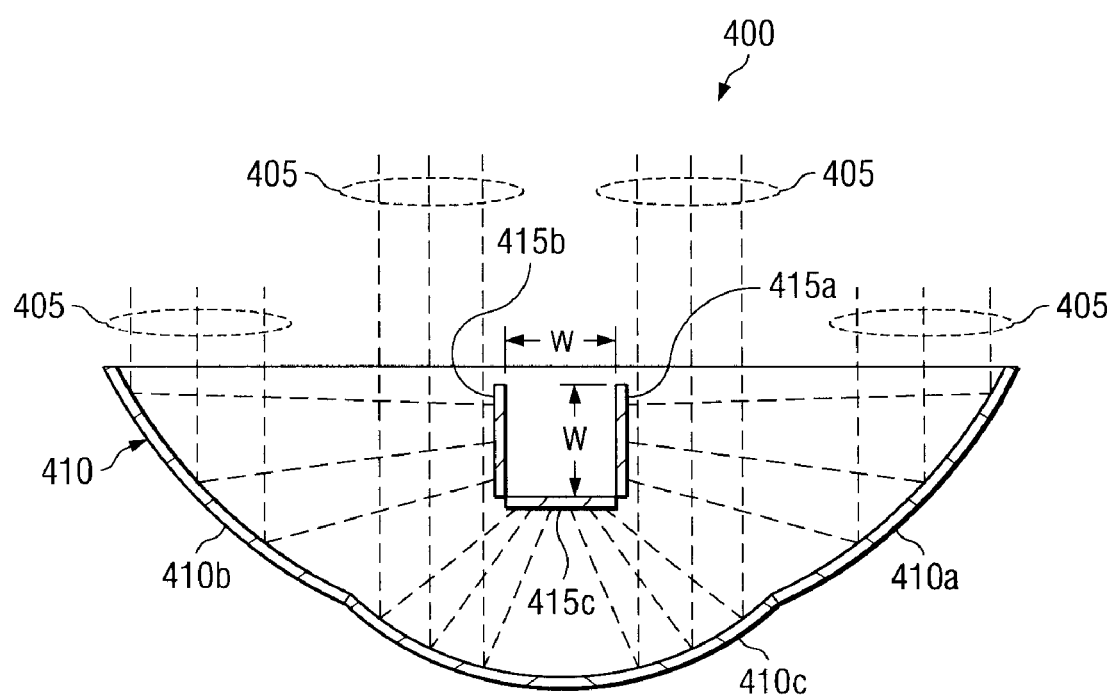
FIG. 4 depicts a cross-sectional view of another embodiment of the radiant energy collector.

A further embodiment of a radiant energy collector 400 is depicted in FIG. 4. In FIG. 4, the reflecting surface 410 is divided into three portions, outer portions 410a and 410b, and inner portion 410c. Also disclosed in FIG. 4 is a rectangularly-shaped receiving surface 415. The outer portions 410a and 410b are positioned so that the radiant energy collected and focused by those sections is directed onto surfaces 415a and 415b, respectively, of the receiving surface 415. Similarly, the inner portion 410c is positioned so that the radiant energy collected and focused by this section is directed onto surface 415c of the receiving surface 415. Each of the sections of the reflecting surface (410a, 410b, and 410c) is shaped according to the formula described above so that the focused radiant energy 505 is uniformly distributed across the width W of each corresponding receiving surface (415a, 415b, and 415c). The distribution of the focused radiant energy across the width W of each section of the receiving surface (415a, 415b, and 415c) is similar to the energy distribution shown in FIGS. 1A and 3A. Indeed, a substantially uniform distribution of energy will generally have a variance less than about 5% across the width W of each section of the receiving surface (415a, 415b, and 415c). Preferably, however, the variance will be less than about 2% across the width W. One advantage of the embodiment depicted in FIG. 4 is that a larger portion of the incoming radiant energy 405 can be captured and utilized by this device than those devices having no inner reflective surfaces. In addition, the embodiment depicted in FIG. 4 can be implemented in a bowl-shaped device and a trough-shaped device, as further explained below.

Figure 5:
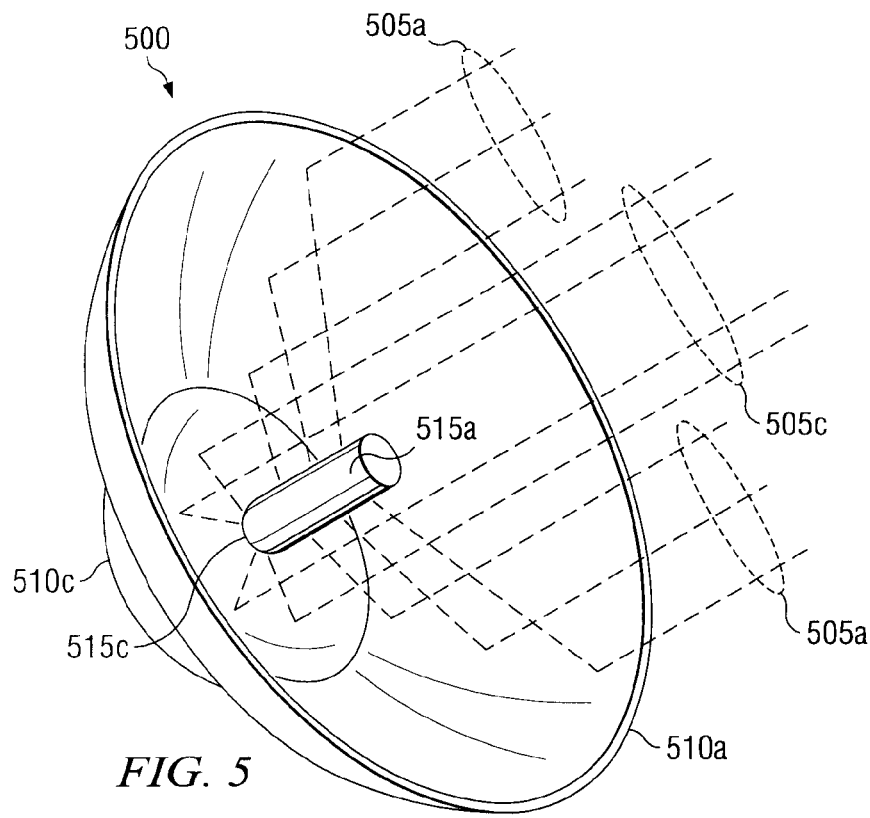
FIG. 5 depicts a bowl-shaped embodiment of the device depicted in FIG. 4.

A bowl-shaped embodiment 500 of the device depicted in FIG. 4 is illustrated in FIG. 5. In FIG. 5, the outer portion of the reflecting surface 510a utilizes the shape described above to collect and focus incoming radiant energy 505a onto a cylindrical-type receiving surface 515. In addition, the inner portion of the reflecting surface 510c utilizes the shape described above to collect and focus incoming radiant energy 505c onto the circular receiving surface 515c. As mentioned previously, one advantage of the bowl-shaped embodiment 500 is that the ratio of the surface area of reflecting surfaces (510a and 510c) to the surface area of the receiving surfaces (515a and 515c) is very large, thus improving the concentration of the collected radiant energy and thereby its efficiency. The bowl-shaped embodiment also has particular advantages for applying focused energy to fluids disposed in the receiving surface. As mentioned previously, the bowl-shaped embodiment 500 can be used to collect and focus sunlight onto a circulating water supply within the receiving surfaces 515. The high concentration of sunlight on the receiving surfaces 515 provides very effective solar heating of water. Of course, other fluids can be effectively heated using this embodiment. It is contemplated that other heat engines or energy collecting devices can be utilized with this embodiment.

Figure 6:
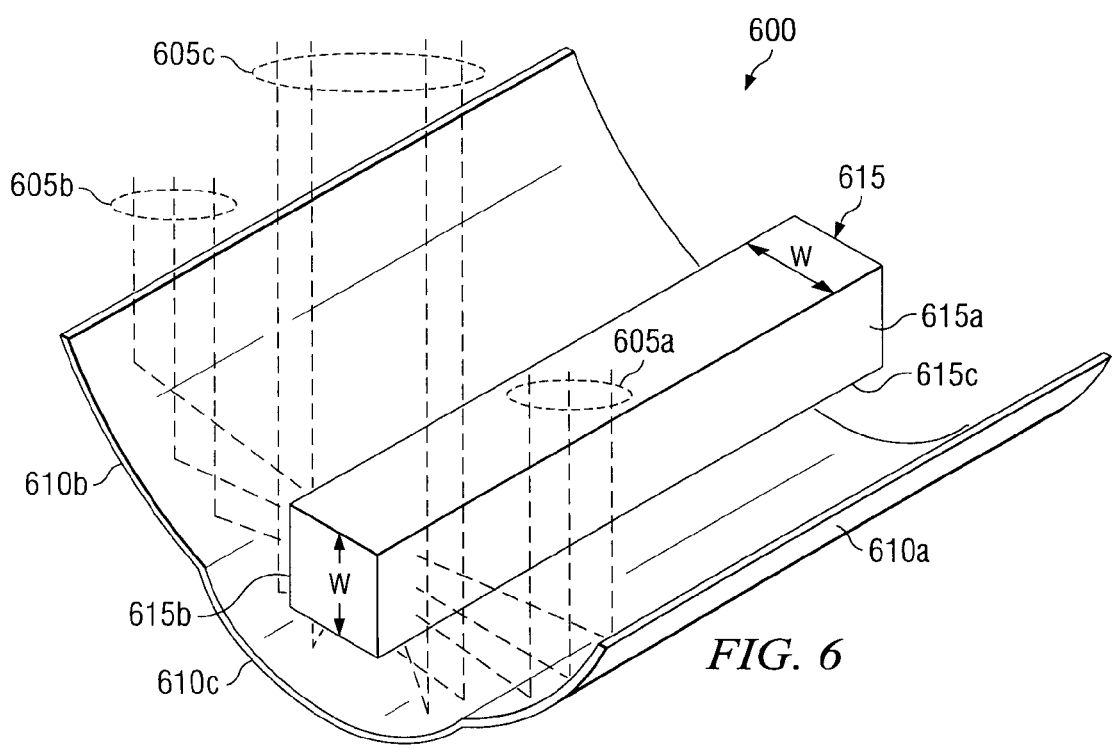
FIG. 6 depicts a trough-shaped embodiment of the device depicted in FIG. 4.

A trough-shaped embodiment 600 of the device depicted in FIG. 4 is illustrated in FIG. 6. In FIG. 6, the outer portions of the reflecting surface 610a and 610b utilize the shape described above to collect and focus incoming radiant energy 605a and 605b onto surfaces 615a and 615b of the rectangularly-shaped receiving surface 615. Similarly, the inner portion of the reflecting surface 610c utilizes the shape described above to collect and focus incoming radiant energy 605c onto surface 615c of the rectangularly-shaped receiving surface 615. One advantage of the trough-shaped embodiment 600 is that the receiving surfaces 615a, 615b, and 615c are planar. This arrangement is particularly effective when the incoming radiant energy 605 is focused onto solar cells or other planar energy collecting devices. As mentioned previously, the curve of each of the reflecting surfaces 610a, 610b, and 610c is arranged so that the distribution of the focused radiant energy 605a, 605b, and 605c across the width W of the receiving surfaces 615a, 615b and 615c is substantially uniform. A substantially uniform distribution of energy will generally have a variance less than about 5% across the width W of the receiving surface 615a, 615b, or 615c. Preferably, however, the variance will be less than about 2% across the effective width W.

Figure 7:
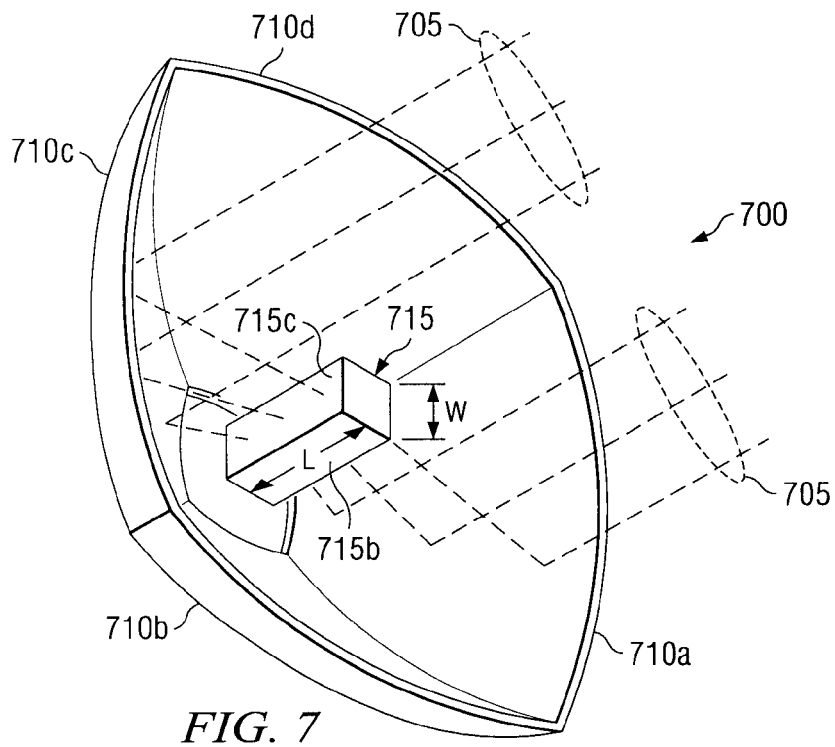
FIG. 7 depicts a perspective view of an alternative embodiment of the radiant energy collector.

Yet another embodiment of a radiant energy collector 700 is depicted in FIG. 7. In FIG. 7, a radiant energy collector 700 is depicted as having four radial sections 710a, 710b, 710c, and 710c. Each of these radial sections utilizes the shape described above to collect and focus incoming radiant energy 705 onto surfaces 715a, 715b, 715c, and 715d, respectively, of the rectangular receiving surface 715. Surface 715a and 715c are hidden in the perspective view of the collector 700 in FIG. 7. Each of the receiving surfaces 715a, 715b, 715c, and 715d is generally planar in shape. In addition, the shape of each radial section 710a, 710b, 710c, and 710c is arranged such that the incoming radiant energy 705 is focused onto each of the corresponding receiving surfaces 715a, 715b, 715c, and 715d so that the focused radiant energy is uniformly distributed across both the width W and the length L of each receiving surface 715a, 715b, 715c, and 715d. This arrangement is particularly effective when the incoming radiant energy 705 is focused onto solar cells or other planar energy collecting devices. As mentioned previously, the curve of each of the radial section 710a, 710b, 710c, and 710d is arranged so that the distribution of the focused radiant energy 705 across the width W and length L of each corresponding receiving surface 715a, 715b, 715c, and 715d is substantially uniform. A substantially uniform distribution of energy will generally have a variance less than about 5% across the width W and length L of the receiving surfaces. Preferably, however, the variance will be less than about 2% across the effective width W and length L. Although FIG. 7 depicts a radiant energy collector 700 in which the reflective surface 710 and the receiving surface 715 comprise four radial sections, a variety of embodiments can be implemented, including, without limitation, three, five, six, seven, and eight radial sections.

Figure 8:
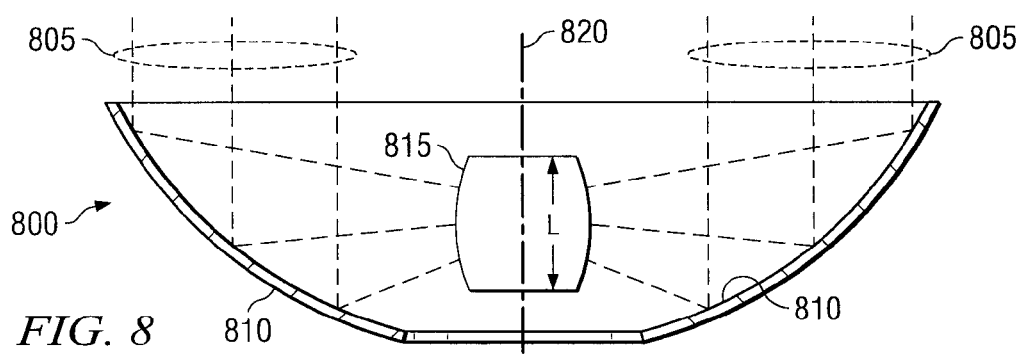
FIG. 8 depicts a cross-sectional view of an alternative embodiment of the radiant energy collector in which the receiving surface is convex.

A cross-sectional view of an alternative embodiment of a radiant energy collector 800 is depicted in FIG. 8. In FIG. 8, radiant energy 805 is received and collected by a reflective surface 810 having a concave shape. As discussed previously, the shape of the reflective surface 810 is arranged such that the incoming radiant energy 805 is focused onto a receiving surface 815. The receiving surface 815 is disposed along the focal axis 820 of the reflective surface. Similar to the embodiment depicted in FIG. 1, the shape of the reflective surface 810 is also configured so that the focused radiant energy provides substantially uniform illumination along the entire axial length L of the receiving surface 815. A substantially uniform distribution of energy will generally have a variance less than about 5% along the effective length L of the receiving surface 815. Preferably, however, the variance will be less than about 2% along the effective length L of the receiving surface 815. The receiving surface 815 of this embodiment distinguishes from the embodiment of FIG. 1 in that it is barrel-shaped, or convex, rather than planar or rectangular. One advantage of a convex-shaped receiving surface is that the focused radiant energy 805 arrives at the receiving surface 815 perpendicularly. This increases the efficiency of the energy transfer from the radiant energy 805 to the receiving surface 815. In contrast, radiant energy that arrives at the a receiving surface at an obtuse (i.e., non-perpendicular) angle, a portion of the radiant energy is more likely to be reflected rather than absorbed by receiving surface. A barrel-shaped or convex receiving surface can be utilized in all of the previously described embodiments (100, 200, 300, 400, 500, 600, and 700) to improve the energy transfer efficiency of the receiving surface.

Figure 9:
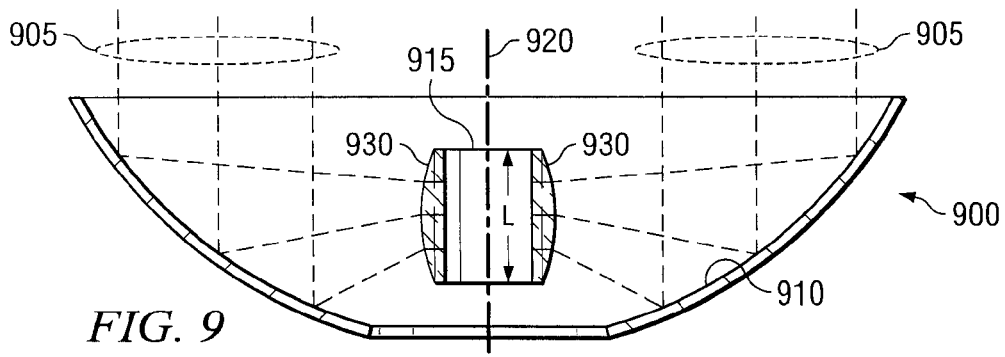
FIG. 9 depicts a cross-sectional view of an alternative embodiment of the radiant energy collector with an optic disposed along the length of the receiving surface.

An alternative to the embodiment disclosed in FIG. 8 is depicted in FIG. 9. In FIG. 9, radiant energy 905 is received and collected by a reflective surface 910 having a concave shape. As discussed previously, the shape of the reflective surface 910 is arranged such that the incoming radiant energy 905 is focused onto a receiving surface 915. The receiving surface 915 is disposed along the focal axis 920 of the reflective surface. Similar to the embodiment depicted in FIG. 1, the shape of the reflective surface 910 is also configured so that the focused radiant energy provides substantially uniform illumination along the entire axial length L of the receiving surface 915. A substantially uniform distribution of energy will generally have a variance less than about 5% along the effective length L of the receiving surface 915. Preferably, however, the variance will be less than about 2% along the effective length L of the receiving surface 915. The receiving surface 915 of this embodiment is cylindrically-shaped and it distinguishes from the embodiments of FIGS. 1 and 8 in that a transparent focusing optic 930 is disposed along the length L of the receiving surface 915. The transparent focusing optic 930 will have a shape that collimates that focused radiant energy 905 before it impacts the receiving surface 915. One advantage of collimating the focused radiant energy 905 is that it arrives at the receiving surface 915 perpendicularly. This increases the efficiency of the energy transfer from the radiant energy 805 to the receiving surface 815. In contrast, when radiant energy that arrives at the a receiving surface at an obtuse (i.e., non-perpendicular) angle, a portion of the radiant energy is more likely to be reflected rather than absorbed by receiving surface. The transparent focusing optic 930 depicted in FIG. 9 is convex or barrel-shaped; however, other shapes may be suitable, depending upon the shape of the reflecting surface 910 and the characteristics of the incoming radiant energy 905. Appropriate filters can be included as part of the transparent focusing optic 930, such as UV or IR filters. Use of these filters can improve the efficiency and performance of photovoltaic cells placed along the receiving surface 915.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A radiant energy collector comprising:
a reflective surface having a concave cross-sectional shape;
a receiving surface that is disposed along the central focal axis of the reflective surface, wherein the reflective surface focuses radiant energy onto the receiving surface;
wherein the reflective surface has a non-conical curvature defined by a predetermined number of reflecting portions each providing a focused segment of substantially equal radiant energy distributed along an axial length of the receiving surface, whereby the acute angle of reflection at which a ray of incoming radiant energy is reflected onto the receiving surface by each reflecting portion is dictated by the slope of the reflective surface at each reflecting portion; and
wherein the focused radiant energy by all of the reflecting portions provides substantially uniform illumination from a top of the receiving surface along its entire axial length to the bottom of the receiving surface.

2. A radiant energy collector according to claim 1, wherein the reflecting portions comprises no more than two-thirds of the overall surface of the reflective surface.

3. A radiant energy collector according to claim 1, wherein the receiving surface has a cylindrical-type shape.

4. A radiant energy collector according to claim 3, wherein the receiving surface has a convex shape along its length so that the focused radiant energy arrives perpendicularly at the surface of the receiving surface.

5. A radiant energy collector according to claim 1, wherein the reflective surface is trough-shaped.

6. A radiant energy collector according to claim 5, wherein the receiving surface has a planar shape.

7. A radiant energy collector according to claim 5, wherein the receiving surface has a convex shape so that the focused radiant energy arrives perpendicularly at the surface of the receiving surface.

8. A radiant energy collector according to claim 1, wherein the reflecting portions comprise a plurality of radial sections and the receiving surface comprises a plurality of receiving sections corresponding to the plurality of radial sections, wherein each of the radial sections focuses radiant energy onto a corresponding receiving section, and wherein the focused radiant energy from each radial section provides substantially uniform illumination across the width of the corresponding receiving section.

9. A radiant energy collector according to claim 8 wherein the radiant energy collector comprises four radial sections.

10. A radiant energy collector according to claim 8 wherein each of the receiving sections has a convex shape so that the focused radiant energy arrives perpendicularly at the surface of each receiving section.

11. A radiant energy collector according to claim 1 wherein the reflective surface scrambles radiant energy received from a radiant energy source that is not substantially aligned with the focal axis of the reflective surface.

12. A radiant energy collector comprising:
  a reflective surface having an outer portion with a concave cross-sectional shape and an inner portion with a concave cross-sectional shape;
  wherein the outer portion is adapted to focus radiant energy onto a first receiving surface that is disposed along the central focal axis of the reflective surface, wherein the outer portion has a non-conical curvature defined by a predetermined number of reflecting portions each providing a focused segment of substantially equal radiant energy distributed so that the focused radiant energy by all of the reflecting portions provides substantially uniform illumination from a top of the first receiving surface along its entire axial length to the bottom of the first receiving surface, whereby the acute angle of reflection at which a ray of incoming radiant energy is reflected onto the first receiving surface by each reflecting portion is dictated by the slope of the outer portion at each reflecting portion;
  and wherein the inner portion is adapted to focus radiant energy onto a second receiving surface that is disposed orthogonally to the central focal axis of the reflective surface so that the focused radiant energy provides substantially uniform illumination along the entire orthogonal width of the second receiving surface.

13. A radiant energy collector according to claim 12, wherein the reflecting portions comprises no more than two-thirds the diameter of the reflective surface.

14. A radiant energy collector according to claim 12, wherein the first receiving surface has a cylindrical-type shape.

15. A radiant energy collector according to claim 14, wherein the first receiving surface has a convex shape so that the focused radiant energy arrives perpendicularly at the surface of the first receiving surface.

16. A radiant energy collector according to claim 12, wherein the reflective surface is trough-shaped.

17. A radiant energy collector according to claim 16, wherein the first receiving surface has a planar shape.

18. A radiant energy collector according to claim 16, wherein the first receiving surface has a convex shape so that the focused radiant energy arrives perpendicularly at the surface of the first receiving surface.

19. A radiant energy collector according to claim 12, wherein the reflecting portions of the outer portion of the reflecting surface comprise a plurality of radial reflecting sections and the first receiving surface comprises a plurality of radial receiving sections corresponding to the plurality of radial reflecting sections, wherein each of the radial reflecting sections focuses radiant energy onto a corresponding radial receiving section, and wherein the focused radiant energy from each radial reflecting section provides substantially uniform illumination across the width of the corresponding radial receiving section.

20. A radiant energy collector according to claim 19 wherein the radiant energy collector comprises four radial sections.

21. A radiant energy collector according to claim 19 wherein each of the radial receiving surfaces has a convex shape so that the focused radiant energy arrives perpendicularly at the surface of each radial receiving surface.

22. A radiant energy collector according to claim 12 wherein the reflective surface scrambles radiant energy received from a radiant energy source that is not substantially aligned with the focal axis of the reflective surface.

* * * * *